US007788175B1

(12) United States Patent
Hadfield

(10) Patent No.: US 7,788,175 B1
(45) Date of Patent: Aug. 31, 2010

(54) INTERNET-BASED CHECK ORDERING SYSTEM

(76) Inventor: Cindy Hadfield, 3084 W. St. Rte. 122, Franklin, OH (US) 45005

( * ) Notice: Subject to any disclaimer, the term of this patent is extended or adjusted under 35 U.S.C. 154(b) by 2316 days.

(21) Appl. No.: 10/647,849

(22) Filed: Aug. 25, 2003

(51) Int. Cl.
*G06Q 40/00* (2006.01)
(52) U.S. Cl. .............................. 705/42; 705/35; 705/70
(58) Field of Classification Search .................. None
See application file for complete search history.

(56) References Cited

U.S. PATENT DOCUMENTS 6,070,150 A * 5/2000 Remington et al. ........... 705/34
6,076,075 A * 6/2000 Teicher ...................... 705/41

OTHER PUBLICATIONS

Deluxe.com <URL: http://www.deluxe.com> [online] 1996-2004 [retrieved on Sep. 19, 2007]. Retrieved from the Internet:<URL: http://www.archive.org>.*
Deluxe Personal Checks; Business Checks, Bank and Credit Union Products. www.deluxe.com.

* cited by examiner

*Primary Examiner*—Thomas Dixon
*Assistant Examiner*—Benjamin S Fields
(74) *Attorney, Agent, or Firm*—R. William Graham

(57) ABSTRACT

An Internet-based check ordering system includes an Internet-based server having a check order entry user interface, a bank transit number computer system in operable communication with the Internet-based server computer system, a client computer system in operable communication with the Internet-based server computer system and a printing system in operable communication with the Internet-based server computer system to print the ordered checks.

5 Claims, 3 Drawing Sheets

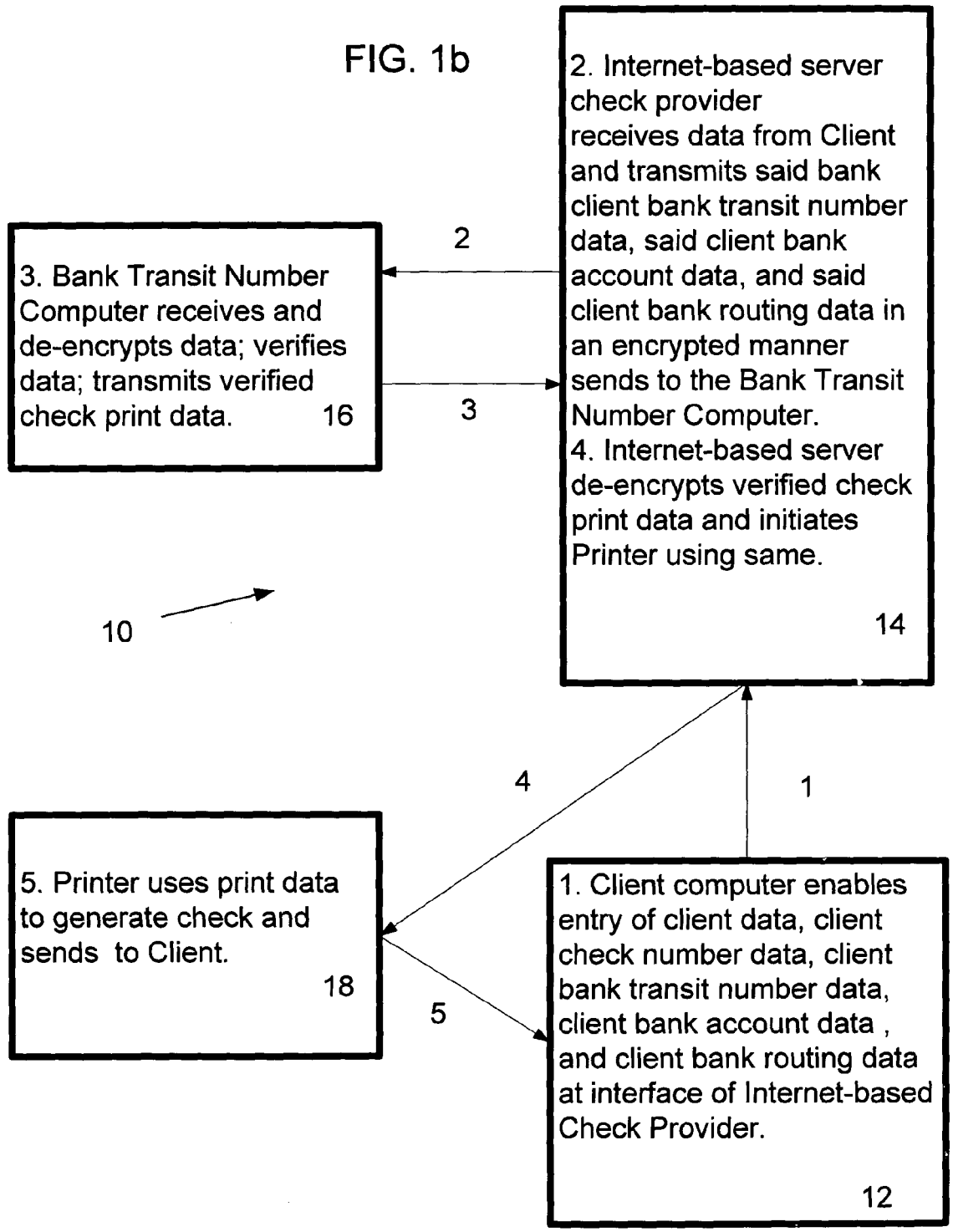

INTERNET-BASED CHECK ORDERING SYSTEM

BACKGROUND OF THE INVENTION

1. Field of the Invention

The present invention relates to a method and system for ordering checks. More particularly, the invention relates to an Internet-based check ordering system including an Internet-based server having a check order entry user interface, a bank transit number computer system in operable communication with the Internet-based server computer system, a client computer system in operable communication with the Internet-based server computer system and a printing system in operable communication with the Internet-based server computer system to print the ordered checks.

2. Related Art

There exist a number of systems for remotely ordering business checks. The more automated systems generally relate to the reordering of checks. However, a problem remains with the initial ordering of checks in that a copy of the client/prospective customer's check is required to be sent to the printer.

Thus, producing checks for a new customer is not easily accomplished and currently still requires that the two parties actually communicate and partake in manual tasks, as opposed to a more automated system which requires only the input of data. Some systems provide partial automated solutions to obtain checks once the client is in their system, thus enabling reordering of checks. However, these systems fail to provide an adequate total solution for ordering checks.

This problem is due to the fact that ordering of checks is a sensitive task. Each check includes certain bank transit data, account data and routing information which is oriented in a particular manner of the issuing bank branch to maintain validity of the check produced. The prior semi-automated systems do not provide for this when making an initial order.

Accordingly, there remains a need to provide a solution to enable initial ordering as well as reordering of checks over the Internet. The present invention provides such a solution and overcomes the deficiency in the art.

BRIEF SUMMARY OF THE INVENTION

It is an object of the invention to improve the check ordering process.

It is another object of the invention to enable initial or new checks to be ordered over an Internet-based system.

Accordingly, the invention is directed to an Internet-based check ordering system. The system includes a client computer system and an Internet-based server having a check order entry user interface remote from and in operable communication with the client computer system, wherein the Internet-based server includes software for enabling input at the interface of client data, client check number data, client bank transit number data, client bank account data, and client bank routing data at the check order user interface and has means for transmitting the bank client bank transit number data, the client bank account data, and the client bank routing data in an encrypted manner. A bank transit number computer system remote from and is in operable communication with the Internet-based server computer system and has software for receiving the client bank transit number data, client bank account data, and client bank routing data from the Internet-based server and de-encrypting the client bank transit number data, the client bank account data, and the client bank routing data and comparing at least the client bank transit number data with a data listing corresponding to transit number data for a plurality of banks within a database therein to verify that the client bank transit number corresponds to bank transit data in the database. The bank transit number computer system software transmits to the Internet-based server verified check print data which includes the client bank transit number data, client bank account data, client bank routing data in a predetermined printing orientation for printing. A printing station is in operable communication with the Internet-based server computer system to print checks bearing the data thereon in the orientation.

Other objects and advantages will be readily apparent to those skilled in the art upon viewing the drawings and reading the detailed description hereafter.

BRIEF DESCRIPTION OF THE DRAWINGS

FIG. 1b is a schematic of the present invention.

DETAILED DESCRIPTION OF THE INVENTION

Figure 1A:
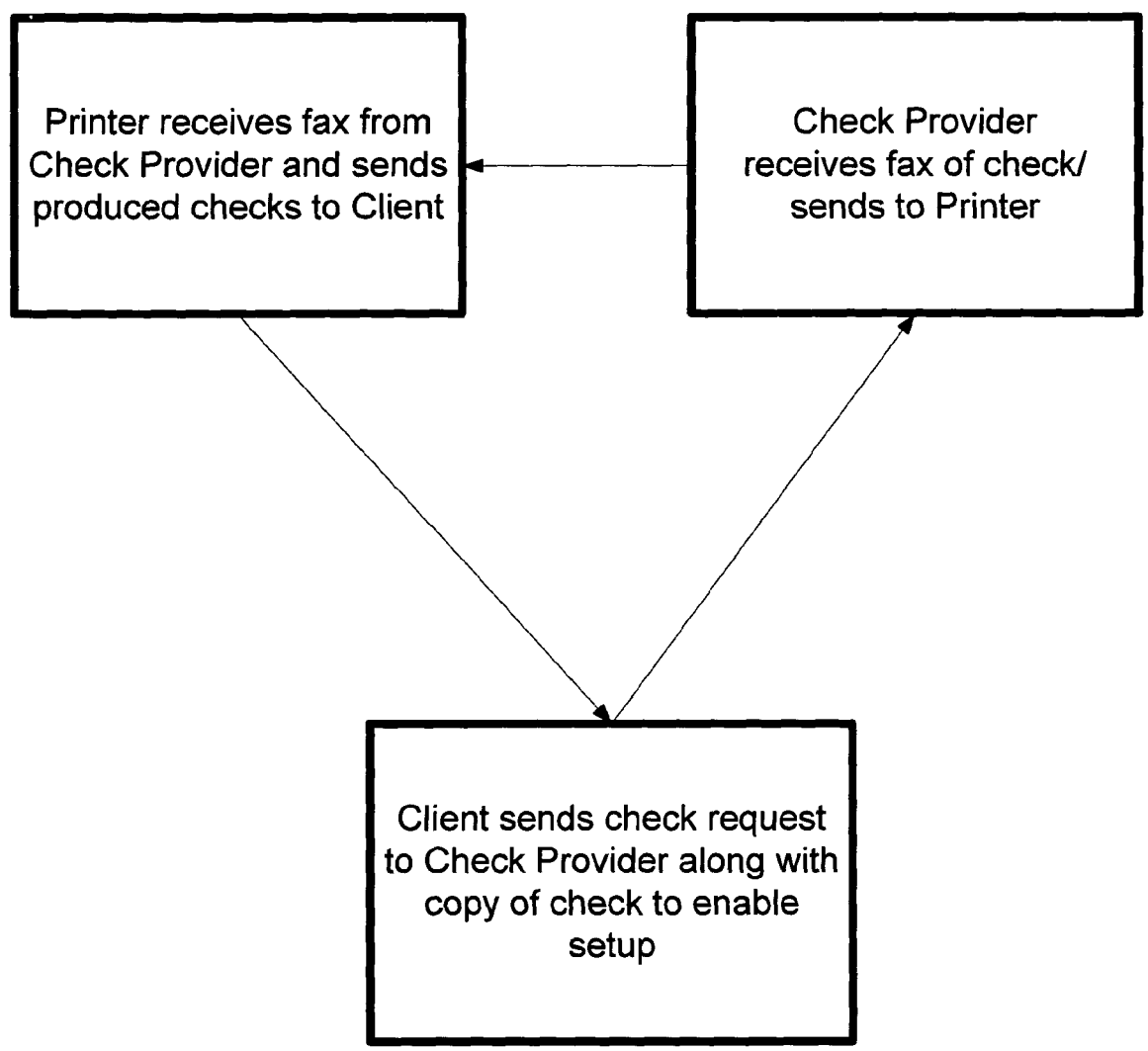
FIG. 1a is a schematic of the state of the prior art.

Referring now to the drawings, the Internet-based check ordering system of the present invention is generally designated by the numeral 10. The Internet-based check ordering system 10 includes a client computer system 12, an Internet-based server 14 operably connected to the client computer system 12, a bank transit number computer system 16 operably connected to the Internet-based server 14 and a printing system 18 operably connected to the Internet-based server 14.

The Internet-based server 14 has a check order entry user interface, wherein the Internet-based server 14 includes software for enabling input at the interface of receiving client data, client check number data, client bank transit number data, client bank account data (e.g., checking or savings, etc.), and client bank routing data. In addition, the user interface is programmed to generate a price corresponding to check order and is further equipped with billing information capturing means, as is known in the art, to enable the client to be billed for the ordered checks via the Internet. The software on the Internet-based server is equipped to transmit the bank client bank transit number data, the client bank account data, and the client bank routing data in an encrypted manner.

The bank transit number computer system 16 is in operable communication with the Internet-based server computer system 14 and has software for receiving the client bank transit number data, the client bank account data, and the client bank routing data from the Internet-based server 14 and de-encrypting the client bank transit number data, the client bank account data, and the client bank routing data. The software on the bank transit number computer system 16 compares at least the client bank transit number data with a data listing corresponding to transit number data for a plurality of banks stored within a database operably associated with the bank transit number computer system 16 to verify that the client bank transit number corresponds to bank transit data in the database. The transit number data for the banks on the bank transit number computer system 16 correspond to federal reserve approved banks, for example, and have been given a unique transit number and MICR data 116 described hereinafter. The software on bank transit number computer system 16 transmits to the Internet-based server 14 verified check print data which includes the client bank transit number data, the client bank account data, and the client bank routing data in a predetermined printing orientation i.e., MICR data 116, in an encrypted manner. The Internet-based server 14 receives and de-encrypts the verified check print data in orientation to enable a printing system 18 in operable communication with the Internet-based server computer system 14 to print the ordered checks 100. The printing system 18 can include a computer which is operably connected to the Internet-based server 14 (either locally or remotely) in a manner to receive the client data, client check number data, client bank transit number data, client bank account data, client bank routing data, the verified check print data in an encrypted form and de-encrypt the data to enable printing of the checks.

Figure 2:
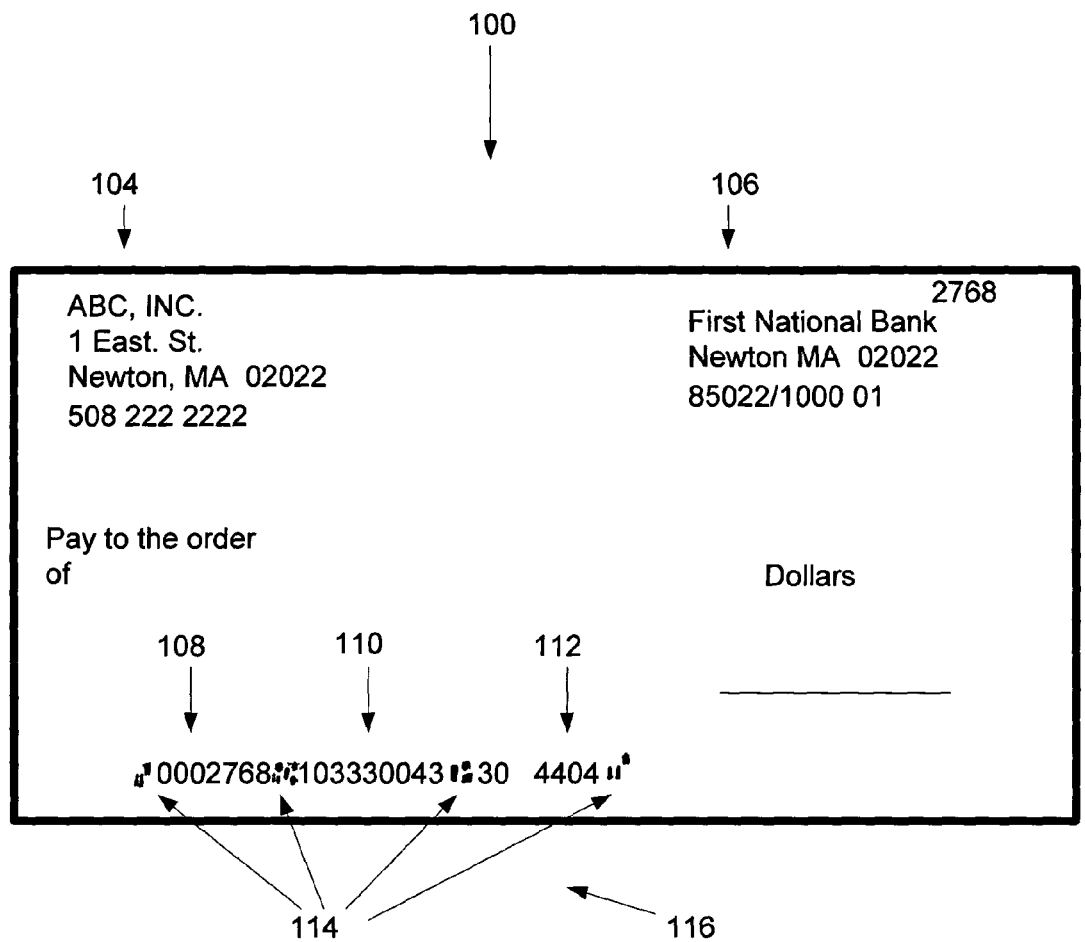
FIG. 2 is a front view of a check used in to illustrate part of the present invention.

It will be helpful in understanding the usefulness of the invention to discuss the construction of a typical blank bank check 100. FIG. 2 illustrates a front side 102 of check 100.

The check 100 includes bank client's data 104, which can include the client's name, address, phone number, etc. The check 100 also includes bank name transit data 106, which includes the branch name and address and branch number. Finally, critical indicia on the check 100 includes check number data 108, client bank account number data 110, and client bank routing number data 112 which includes both humanly-readable and machine-readable information. The data presented on the check 100 contains information for purposes of processing, such as the bank on which the document is drawn, a routing/transit number, the account number of the person who wrote or made out the check, and a transaction code indicating the type of document, i.e., indicating it to be a check or deposit ticket. The check number data 108, client bank account number data 110, and client bank routing number data 112 are usually part of well known MICR (Magnetic Ink Character Recognition) data which includes computer readable indicia 114 and all of which are referred to herein as MICR data 116.

By banking convention, the MICR data 116 must be printed at a precise distance from the right edge of the check with proper symbols and in a given orientation to place the MICR characters in the proper field site. Absent this, and the check 100 is not capable of being validated. It is thus essential that the encoded MICR data 116 be verifiable after printing to assure their accuracy. The MICR data 116 imprinted upon each check extend to each edge on the left and right of the check to within a predetermined given amount.

Once known the printer system 18 is provided with the verified check print data, it is known in the art that a MICR print head of the system 18 can employ the printing sequence at the proper position for such data. It is important to stress that, should the printed characters fail to be in correct and in proper sequence, the check is unable to be validated since it cannot be read by the bank's check processing equipment. Thus, it is imperative that the MICR data 116 be provided correctly. The instant invention enables this to occur upon initial orders without the need of the client faxing in a copy of their check.

The Internet-based server 14 is further operably associated with a database which contains and stores the client data (i.e., name, address, telephone number, billing address information, credit card information data), client check number data, client bank transit number data, client bank account data and client bank routing data as well as associating the received verified check information data from the bank transit number computer system 16 therewith. In this regard, user interface is equipped to recognize the client upon subsequent accessing the Internet-based server 14 for reordering check and can retrieve such stored information for such client for purposes of printing additional check orders.

The above described embodiment is set forth by way of example and is not for the purpose of limiting the present invention. It will be readily apparent to those skilled in the art that obvious modifications, derivations and variations can be made to the embodiment without departing from the scope of the invention. Accordingly, the claims appended hereto should be read in their full scope including any such modifications, derivations and variations.

What is claimed is:

1. An Internet-based check ordering and reordering system, including:

a client computer system;

an Internet-based server having a check order entry user interface remote from and in operable communication with said client computer system, wherein said Internet-based server includes software for enabling input at said interface of client data, client check number data, client bank transit number data including bank branch name, address and branch number, client bank account data, and client bank routing data at said check order user interface and has means for transmitting said bank client bank transit number data, said client bank account data, and said client bank routing data in an encrypted manner;

a bank transit number computer system remote from and in operable communication with the Internet-based server computer system having software for receiving at least said client bank transit number data, said client bank account data, and said client bank routing data from said Internet-based server and de-encrypting said client bank transit number data, said client bank account data, and said client bank routing data, and comparing at least said client bank transit number data with a data listing corresponding to transit number data for a plurality of banks within a database of said bank transit number computer system to verify that said client bank transit number corresponds to bank transit data in said database, and transmits to said Internet-based server verified check print data which includes said client bank transit number data, said client bank account data, and said client bank routing data and a predetermined printing orientation; and a printing station in operable communication with said Internet-based server computer system to print checks bearing said data thereon and a blank amount field.

2. The Internet-based check ordering and reordering system of claim 1, wherein software on said Internet based server includes means for billing a client at said user interface using said system.

3. The Internet-based check ordering and reordering system of claim 1, wherein said Internet-based server is operably associated with a database which contains and stores said client data, said client check number data, said client bank transit number data, said client bank account data and said client bank routing data.

4. The Internet-based check ordering and reordering system of claim 3, wherein said Internet-based server is further equipped to associate and store said received verified check information data from said bank transit number computer system with said client data, said client check number data, said client bank transit number data, said client bank account data and said client bank routing data.

5. The Internet-based check ordering and reordering system of claim 3, wherein said printing station includes a computer which is operably connected to said Internet-based server in a manner to receive said client data, said client check number data, said client bank transit number data, said client bank account data, said client bank routing data and said verified check print data in an encrypted form and de-encrypts said data to enable printing of said checks.

\* \* \* \* \*